United States Patent
Shah (10) Patent No.: US 11,767,372 B2
(45) Date of Patent: Sep. 26, 2023

(54) PHYSICALLY MODIFIED SAGO STARCH

(71) Applicant: Corn Products Development, Inc., Westchester, IL (US)

(72) Inventor: Tarak Shah, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 0 days.

(21) Appl. No.: 16/927,333

(22) Filed: Jul. 13, 2020

(65) Prior Publication Data

US 2020/0369788 A1 Nov. 26, 2020

Related U.S. Application Data

(60) Division of application No. 15/797,386, filed on Oct. 30, 2017, now Pat. No. 10,759,875, which is a continuation of application No. 15/150,953, filed on May 10, 2016, now Pat. No. 9,828,440.

(60) Provisional application No. 62/184,302, filed on Jun. 25, 2015.

(51) Int. Cl.
*C08B 30/12* (2006.01)

(52) U.S. Cl.
CPC .................................. *C08B 30/12* (2013.01)

(58) Field of Classification Search
CPC .............................. C08B 30/00; C08B 30/12
USPC ........................................................ 426/661
See application file for complete search history.

(56) References Cited

U.S. PATENT DOCUMENTS

| | | | |
|---|---|---|---|
| 2,917,506 | A | 12/1959 | Caldwell et al. |
| 3,977,897 | A | 8/1976 | Wurzburg et al. |
| 4,477,480 | A | 10/1984 | Seidel et al. |
| 5,187,272 | A | 2/1993 | Katcher et al. |
| 6,221,420 | B1 | 4/2001 | Thomas |
| 7,422,638 | B2 | 9/2008 | Trksak |
| 2002/0102344 | A1 | 8/2002 | Hanchett |

FOREIGN PATENT DOCUMENTS

| | | |
|---|---|---|
| EP | 0554818 | 8/1993 |
| EP | 2636311 | 9/2013 |
| GB | 765880 | 1/1957 |
| JP | 2010252668 A | * 11/2010 |
| WO | 2005025327 | 3/2005 |

OTHER PUBLICATIONS

Purwani et al, Effect of heat moisture treatment fo sago starch on its noodle quality, 2006, Indonsian Journal of Agricultural Science, 7(1), pp. 8-14 (Year: 2006).*

Wattanachant S et al. "Suitability of Sago Starch as a Base for Dual-modification", Songklanakarin Journal of Science and Technology, Prince of Songkla University, Hat Yai, Th. vol. 24, No. 3, Jul. 1, 2002 pp. 431-438.

Rolf Stute, Hydrothermal Modification Of Starches: The Difference Between Annealing and Heat/Moisture—Treatment, Lecture Presented at the 42nd Starch Convention of the Arbeitsgemeinschaft Getreideforschung at Detmold, Apr. 24-26, 1991, pp. 205-214.

Heidi Jacobs, et al, Hydrothermal Modifications of Granular Starch, with Retention of the Granular Structure, Journal of Agricultural and Food Chemistry, Jul. 30, 1998, pp. 2895-2905, Vo. 46, No. 8, American Chemical Society, Published on Web.

W.J. Wang, et al, Effect of Annealing on the Hydrolysis of Sago Starch Granules, Carbohydrate Polymers, Jan. 5, 1996, pp. 195-202, Elsevier Science Ltd, Great Britain.

Richard F. Tester, et al, Annealing Of Starch-A Review, International Journal of Biological Macromolecules, Dec. 1, 1999, pp. 1-12, Elsevier Science B.V.

Chirdchan Pukkahuta, "Structural Transformation of Sago Starch by Heat-Moisture and Osmotic-Pressure Treatment", Journal-Starch 59 (2007), 624-631, www.starch-journal.com (Year 2007).

Chung, H J et al., "Effect of single and dual hydrothermal treatments on the crystalline structure, thermal properties, and nutritional fractions of pea, lentil, and navy bean starches", Food Research International, Elsevier, Amsterdam, NL, vol. 43, No. 2, Mar. 1, 2010, pp. 501-508.

* cited by examiner

*Primary Examiner* — Jyoti Chawla (74) *Attorney, Agent, or Firm* — Rachael Casey

(57) ABSTRACT

The present invention relates to physically modified sago starch which exhibits an increased onset of gelatinization temperature and controlled viscosity development, yet retains significant hot and cold viscosity, the process of making such starch, and the use thereof. Such starches are useful in a variety of products, particularly as viscosifiers.

6 Claims, 8 Drawing Sheets

FIG. 1

DEPICTION OF CONTROLLED VISCOSITY/SWELLING DEVELOPMENT RATES OF ANNEALED SAGO STARCHES DURING HEATING.

FIG. 2

MVAG-U VISCOSITY DEVELOPMENT OF NATIVE AND ANNEALED SAGO STARCHES DURING HEATING AND COOLING (6% SOLIDS, pH-6.0 BUFFER SOLUTION).

FIG. 3

MVAG-U VISCOSITY DEVELOPMENT OF NATIVE AND ANNEALED SAGO STARCHES DURING HEATING AND COOLING (6% SOLIDS, pH-6.0 BUFFER SOLUTION).

RVA VISCOSITY PROFILES OF NATIVE AND ANNEALED SAGO STARCHES IN SUGAR-SALT SOLUTION.

X-RAY CRYSTALLINITY PATTERN OF NATIVE AND HEAT MOISTURE TREATED SAGO STARCHES

FIG. 8

PHYSICALLY MODIFIED SAGO STARCH

CROSS-REFERENCE TO RELATED APPLICATIONS

This application is a divisional of U.S. patent application Ser. No. 15/797,386, filed Oct. 30, 2017, which is a continuation of U.S. patent application Ser. No. 15/150,953, filed May 10, 2016 which claims the benefit of U.S. Provisional Patent Application No. 62/184,302, filed Jun. 25, 2015, each of which is incorporated by reference herein in its entirety.

BACKGROUND OF THE INVENTION

The present invention relates to physically modified sago starch which exhibits an increased onset of gelatinization temperature and controlled viscosity development, yet retains significant viscosity, the process of making such starch, and the use thereof.

It is known that starch can be used to add texture to products by taking advantage of its viscosifying properties. For example, starch is used in sauces and gravies, soups, creamers, salad dressings, and other food and industrial products to thicken or even gel the products and provide a variety of functionality.

SUMMARY OF THE INVENTION

The present invention is directed to a sago starch which is physically modified, either annealed in excess water in the presence of a swelling inhibition agent or heat-moisture treated. The resultant physically modified starch differs from the base starch (starch prior to heat treating) in that it exhibits an increased onset of gelatinization temperature and controlled viscosity development, yet retains significant viscosity. Such starches are useful in a variety of products, particularly as viscosifiers.

Sago starch, as used herein, is intended to mean starch extracted from the pith of a sago palm tree.

Amylose containing, as used herein, is intended to mean a starch with at least 5% amylose (w/w) based upon the starch.

Gelatinization, as used herein, is intended to mean the process by which starch is cooked out and loses its granular structure. Granular is intended to mean the structure of starch in which the starch is not cold water soluble (still at least partly crystalline) and exhibits birefringence and a typical Maltese cross under polarized light. During gelatinization, as used herein, starch loses its birefringent property as well as any Maltese cross present in its native state.

Physical modification, as used herein, is intended to mean annealing or heat-moisture treatment, and together may also be referred to as heat treatment.

Annealing, as used herein, is intended to mean the process of heat treating starch in excess water such that the percent water is at least 50% (w/w) based upon the starch/water mixture (dry solids basis).

Heat moisture treatment (HMT), as used herein, is intended to mean the process of heat treating starch such that the percent water is no more than 50% (w/w) based upon the starch/water mixture (dry solids basis).

Native, as used herein, is intended to mean unmodified starch as extracted from the sago palm.

DETAILED DESCRIPTION OF THE INVENTION

The present invention is directed to a sago starch which is physically modified, either annealed in excess water in the presence of a swelling inhibition agent or heat moisture treated. The resultant physically modified starch differs from the base starch (starch prior to heat treatment) in that it exhibits an increased onset of gelatinization temperature and controlled viscosity development, yet retains significant hot and cold viscosity.

The base material used for the present invention is any amylose-containing native sago starch extracted from the pith of the sago palm tree. While there are no commercially available high amylose varieties of sago in which at least 40% of the starch is amylose, it is expected that such high amylose sago starch would work well in this invention due to the presence of amylose. The starch base used in the process of this invention must be in intact granule form, e.g. not gelatinized. In one embodiment, the base starch is native starch as extracted from the palm tree and has not been converted (hydrolyzed) or otherwise modified.

It is well known that starch is generally composed of two fractions: a substantially linear fraction known as amylose and a branched fraction known as amylopectin. Each starch type contains these two fractions in a ratio characteristic of that starch. In one embodiment, sago starches with amylose concentrations ranging approximately from 15 to 40 percent of the total starch by weight are used in this invention. In another embodiment, sago starches with amylose concentrations ranging approximately from 24 to 31 percent of the total starch by weight are used in this invention. In yet another embodiment, high amylose sago starches with amylose concentrations greater than 40 percent of the total starch weight are used. In still yet another embodiment, low amylose sago starches, or those containing less than 15 percent but at least 5 percent amylose by total starch weight are used. Sago starches which are essentially 100 percent amylopectin with little (<5%) or no amylose are not useful in this invention.

The present invention is directed to a sago starch which is physically modified by annealing or by heat moisture treating.

Annealing:

The sago starch may be annealed in excess water in the presence of a swelling inhibition agent. The initial step of the annealed process of this invention is the preparation of a suspension or slurry comprising an amylose-containing sago starch in intact granule form, a swelling inhibition agent, and water.

The suspension should contain sufficient water to slurry the starch granules. In one embodiment, the starch (dry basis) in the slurry is present in an amount of at least 10% (w/w), in another at least 20% (w/w), in yet another at least 30% (w/w), in a further at least 40% (w/w) and in still a further up to 50% (w/w) based upon the slurry. Higher amounts of starch do not tend to permit good agitation, which may result in non-uniform results.

A swelling inhibition agent which will not chemically react with the starch is added prior to, at the same time as, or after the addition of the starch but before significant heating. In one embodiment, the swelling inhibition agent is an inorganic salt and in another embodiment is selected from the group consisting of sodium sulfate, ammonium sulfate, magnesium sulfate, potassium sulfate, sodium chloride, sodium phosphate, potassium chloride, potassium phosphate, ammonium chloride and ammonium phosphate. In yet another embodiment, the salt is sodium sulfate.

The swelling inhibition agent is present in an amount effective to impede gelatinization during the heat treatment and will depend upon a number of factors including the salt used and the level of amylose in the sago starch. In one embodiment, the salt is present in an amount of 10-60% (w/w), and in another 20-50% (w/w) based upon the starch. The presence of the salt in the aqueous suspension of ungelatinized starch impedes gelatinization, allowing molecular reorganization to occur.

In one embodiment, the pH of the slurry is adjusted to from 6.5-9.0 prior to heating. In another embodiment, the pH of the slurry is adjusted to from 6.5-7.5 prior to heating. In one embodiment, the pH is maintained during heating. In another embodiment, the pH is not adjusted after heating starts. Buffers may be used to maintain the pH at an appropriate level. It is important not to allow the pH to become acidic to prevent hydrolysis of the starch and maintain a molecular weight substantially similar to the base starch.

The aqueous slurry is heated at moderate temperatures of from 50° C. to 100° C. In one embodiment, the starch slurry is heated at a temperature of at least 50° C., in another at a temperature of at least 60° C., in yet another at a temperature of at least 70° C., and in still yet another at a temperature of at least 75° C. In one embodiment, the starch slurry is heated at a temperature of no more than 125° C., in another at a temperature of no more than 100° C., and in yet another at a temperature of no more than 90° C. The temperature should be maintained low enough to prevent gelatinization, but higher temperatures will progress the annealing progress more quickly.

The starch slurry is heated for a time effective to anneal the starch to reach an effective functionality. The time needed will depend upon a variety of factors including the amylose content of the starch and the temperature of heating. Heating time is measured from the time at which the starch slurry reaches the target temperature. In one embodiment, the starch slurry is heated for at least 30 minutes, in another embodiment for at least one hour and in yet another embodiment for at least two hours. In one embodiment, the starch is heated for no more than 24 hours.

In one embodiment, the temperature is increased in a stepwise fashion. In one such embodiment, the temperature is increased to at least 50° C. and held at 50° C. for at least 30 minutes; the temperature is then increased to at least 60° C. and held at 60° C. for at least 30 additional minutes (two step heating). The heating may also be done in more than two steps. In this embodiment, the heating time is measured from the time at which the starch slurry reaches each target temperature.

The annealing may be conducted at any pressure: under vacuum, at atmospheric pressure, or under increased pressure. In one embodiment, the heating is conducted under atmospheric pressure.

Heat Moisture Treatment.

The sago starch may be heat moisture treated. The initial step of the heat moisture treatment is to optionally add water to the starch. If the moisture content of the starch (on a dry basis) is at least 10% (w/w), the heat moisture treatment may be conducted without additional water. Optionally, enough water may be added such that the water is present in an amount of no more than 50% (w/w) based upon the starch/water mixture.

In one embodiment, this percent moisture is maintained substantially constant throughout the heating step. In another embodiment, no water is added to the blend during heating (i.e., no water is present during the heating step other than the equilibrium moisture content of the components). In another embodiment, the moisture content is not controlled (kept substantially constant) during the heat-moisture treatment such that the resultant complex has a lower moisture content than the blend.

An inorganic salt which will not chemically react with the starch may optionally be mixed into the starch water mixture. In one embodiment, the salt is selected from the group consisting of sodium sulfate, ammonium sulfate, magnesium sulfate, potassium sulfate, sodium chloride, sodium phosphate, potassium chloride, potassium phosphate, ammonium chloride and ammonium phosphate. In another embodiment, the salt is sodium sulfate.

The salt is present in an amount effective to impede gelatinization during heat treatment and will depend upon a number of factors including the salt used and the level of amylose in the sago starch. The presence of the salt in the water component of the mixture impedes gelatinization, allowing the crystalline structure of the starch to change.

The sago starch/water mixture is then heat-moisture treated at a target temperature of from about 60 to 160° C., and in one embodiment at a temperature of from about 80 to 120° C. While the most desirable temperature and water content may vary depending on the amylose content of the starch, it is important that the starch remain in the granular state. Granular state is intended to mean that the starch does not lose its crystalline and birefringent characteristics.

In one embodiment, the temperature is increased in a stepwise fashion. In one such embodiment, the temperature is increased to at least 60° C. and held at 60° C. for at least 30 minutes; the temperature is then increased to at least 70° C. and held at 70° C. for at least 30 additional minutes (two step heating). The heating may also be done in more than two steps. In this embodiment, the heating time is measured from the time at which the starch slurry reaches each target temperature.

Heating time is measured from the time at which the starch slurry reaches the target temperature. The time of heating at the target temperature may vary depending on the amylose content of the sago starch and particle size, as well as the amount of moisture and the heating temperature. In one embodiment, such heating time will be from about 15 minutes to 24 hours. In another embodiment, the heat time at the target temperature will be from about 30 minutes to 2 hours.

The heat moisture treatment may be conducted at any pressure: under vacuum, at atmospheric pressure, or under increased pressure. In one embodiment, the heating is conducted under atmospheric pressure.

Additional Treatment.

The physically modified sago starch may be additionally processed either before or after the heat-treatment, as long as such process does not destroy the granular structure of the starch. In one embodiment, such additional processing may include degradation using alpha-amylase or acid treatment and in another embodiment, chemical modification. In one embodiment, the starch will not be chemically modified. The particle size of the starch may be adjusted, before heat treatment, for example by grinding, agglomerating, and/or sieving.

The starch may be used as is or may first be washed to remove the salt. In one embodiment, the salt is removed prior to use by washing with excess water. The starch may be purified, either before or after physical modification, by any method known in the art, including without limitation to remove off-flavors, odors, or colors that are native to the starch or created during processing. Suitable purification processes for treating starches are disclosed in the family of patents represented by EP 554 818 (Kasica, et al.). Alkali washing techniques are also useful and described in the family of patents represented by U.S. Pat. No. 4,477,480 (Seidel) and U.S. Pat. No. 5,187,272 (Bertalan et al.). In one embodiment, the starch is bleached using methods known in the art to reduce color. In one aspect of the invention, the starch is purified post-heat treatment. The pH of the starch may also be adjusted post-heat treatment using methods known in the art. In one embodiment, the pH of the complex is adjusted to between 5.5 and 8.0.

The starch may also be recovered using conventional methods. In one embodiment, the starch is recovered by drying means known in the art and selected from the group consisting of air drying, belt drying, flash drying and spray drying. In another aspect of the invention, the starch is dried by spray drying. In another aspect, the starch is dried by flash drying. It is important that if the starch is recovered, it is done without gelatinization.

The pre- and/or post-heat treatment processing methods used may further control the physical or chemical properties of the starch or otherwise make the starch more desirable for use in foods.

The heat treatment is continued until the desired functionality is achieved. The resultant physically modified starch differs from the base starch (starch prior to heat treatment) in that it exhibits an increased onset of gelatinization temperature and controlled viscosity development, yet retains significant hot and cold viscosity. When cooked out (gelatinized), the resultant starch may further provide a smooth, non-cohesive texture. In contrast to many other physically modified starches, the molecular reorganization of the sago starch using the processes of this invention occurs without changing the type of crystallinity (measured by X-ray diffraction) such that the major classification of crystalline structure is retained. In one embodiment, the crystalline structure of the physically modified sago starch is A-Type.

The resultant sago starch will not be significantly hydrolyzed and thus will have substantially the same molecular weight as the native sago prior to heat treatment. In one embodiment, the average molecular weight will be at least 90%, in another embodiment at least 95%, that of the native sago.

The resultant sago starch has an onset of gelatinization temperature (To) of at least 71° C., in another embodiment at least 75° C., in yet another embodiment at least 80° C., as measured using the DSC method in deionized (DI) water set forth in the Examples section. The resultant sago starch has an increase in onset of gelatinization temperature (To) of at least 2° C. more, in another embodiment at least 5° C. more and in yet another embodiment at least 8° C. more than the native sago starch, as measured using the DSC method in deionized (DI) water set forth in the Examples section.

The resultant sago starch has an onset of gelatinization temperature (To) of at least 75° C., in another embodiment at least 80° C., in yet another embodiment at least 82° C., and in still yet another embodiment at least 85° C., as measured using the DSC model food system method set forth in the Examples section. The resultant sago starch has an increase in onset of gelatinization temperature (To) of at least 3° C. more, in another embodiment at least 5° C. more and in yet another embodiment at least 8° C. more than the native sago starch, as measured using the DSC model food system method set forth in the Examples section.

Controlled viscosity development means that the viscosity progresses in a controlled manner for a significant portion of gelatinization, and does not progress too rapidly. In one embodiment, the viscosity development is delayed as evidenced by delayed swelling of the starch granule. Controlled viscosity development is measured by the deionized water method set forth in the Examples section by rate of viscosity development from 100 to 600 MVU and optionally from 100 MVU through to the peak (Tp). In one embodiment, the rate of viscosity development from 100 to 600 MVU is less than 15 MVU/sec, in another embodiment less than 10 MVU/sec, in yet another embodiment less than 8 MVU/sec, and in still yet another embodiment is less than 5 MVU/sec. In one embodiment, the rate of viscosity development from 100 to peak viscosity is less than 10 MVU/sec, in another embodiment less than 8 MVU/sec, in yet another embodiment less than 5 MVU/sec and in still yet another embodiment less than 3 MVU/sec.

Unlike some other types of modified starch, the physically modified sago starch retains significant viscosity. Viscosity is measured by the method set forth in the Examples section by peak viscosity and end viscosity. In one embodiment, the peak viscosity is at least 400 MVU, in another embodiment is at least 600 MVU, and in yet another embodiment at least 700 MVU. In one embodiment, the end viscosity is higher than that of native sago, in another embodiment is at least 1300 MVU, and in yet another embodiment at least 1500 MVU.

Additionally, depending on the extent of the physical modification, the resultant sago starch showed continual increase in viscosity up to 95° C. as well as during the hold at 95° C. showing very good process tolerance to heat and shear with minimal or no viscosity breakdown. This gradual and controlled viscosity development is indicative of delayed swelling behavior of the physically modified starch granules.

Further, the breakdown of viscosity is minimized. Viscosity breakdown means the viscosity at peak minus the viscosity at the end of 95° C. hold divided by the viscosity at peak using the MVAG-U method set forth in the examples section. In one embodiment, the breakdown viscosity is less than 40%, in another embodiment is less than 30%, in yet another embodiment is less than 20%, and in still yet another embodiment is less than 10%. In one aspect of the invention, no peak viscosity is reached and the viscosity continues to rise throughout the MVAG-U method.

The physically modified sago starches may be used in a variety of end use applications including both food and industrial. Food, as used herein, is intended to mean any ingestible product including without limitation, food, beverages, and nutraceuticals. Food applications in which the sago starches of this invention may be used include, without limitation, salad dressings, sauces and gravies, dry mixes, soups, dairy products such as puddings, custards, yogurts, sour creams, cheese, etc., flans, and pie fillings, fruit preps, jellies and jams, bakery products such as cakes, muffins, brownies, cookies, breads, etc., confectionery, snacks, batters, breadings and coatings, retorted products and meat products. Industrial applications include without limitation pharmaceuticals, home and fabric care products, personal care products, paper, agricultural products, paints, bioplastics, glass fiber, oil well drilling and mining products.

In one embodiment, the physically modified sago starch is used in a thin-thick application. Thin-thick applications are, as used herein, are compositions in which an aqueous starch suspension which is initially low in viscosity (thin), yet which develops full viscosity upon heating, shearing, or other processing is preferred. In one example, the thin-thick application is a retorted composition. The initial thin viscosity of such composition allows initial rapid heat penetration necessary for the heat sterilizations of such compositions, including those processed in high temperature-short time sterilization (HTST) food canning processes, in which the complete retorting cycle is less than 20 minutes. After the heat penetration or sometime during such penetration, the starch develops viscosity, contributing to excellent color, smooth texture, good clarity, flavor and/or food value. Another similar thin-thick application is UHT (ultra high temperature) processing. Yet another is aseptic packaging. In any of these processes, the starch does not achieve its peak and/or final viscosity until the $F_0$ value is achieved. $F_{0\ is}$ the time in minutes (at a reference temperature of 121° C.) to provide the appropriate spore destruction (minimum health protection or commercial sterility). Examples of such compositions include without limitation, canned foods such as soup or particulate food in a sauce (such as baked beans), fruit preps, jams, jellies, fruit fillings, and puddings and custards.

In another embodiment, the thin-thick application is pasteurization, including without limitation pasteurization of dairy compositions including milk, creamers, and yogurt, alternative dairy compositions such as soy or nut milks and non-dairy creamers, infant milk formulas, adult meal replacement and supplement drinks, and alcoholic beverages such as beer and wine. This is similar to the aforementioned heat processing, but is conducted to reduce the number of viable pathogens, not necessarily to sterilize the composition. Pasteurization may include HTST and UHT (described above) as well as (Extended Shelf Life) processing.

These types of processes are well-known in the art. In one aspect of the invention, the increased onset of gelatinization temperature makes it possible to pasteurize or sterilize the food without fully swelling or cooking out the physically modified sago starch. This provides the food processor or end user (e.g., consumer) with the opportunity to do so at a later time. Thus, full viscosity development may be developed by the food processor or end user after pasteurization or sterilization, such as during later processing or when cooking the food product at home.

In another aspect of the invention, the thin-thick application is one in which the viscosity development is triggered by shear. Such aspect includes high shear processing such as for a salad dressing. The initial thin viscosity of such composition more readily allows shear processing, with less energy and/or adverse effects on the composition. As the shear processing progresses or after its completion, the starch develops viscosity, contributing to excellent color, smooth texture, good clarity, flavor and/or food value; however, the starch does not achieve its peak and/or final viscosity until the processing is significantly completed.

In yet another aspect of the invention, the physically modified sago starches may be used in dry mixes, including without limitation pancakes and waffle mixes, baked good mixes such as breads, biscuits, muffins, cakes and cookies, soup mixes, powdered creamers, and gravy mixes. In such applications, the delayed onset of gelatinization and controlled viscosity development allows for better incorporation into the final composition (e.g., batter or liquid).

The physically modified sago starch may be used in any amount necessary to achieve the characteristics desired for the particular end use application. In general, the starch is used in an amount of at least about 1%, particularly at least about 2.5%, more particularly at least about 5%, by weight of the product. In general, the starch is used in an amount of no more than about 95%, particularly no more than about 90%, more particularly no more than about 80%, by weight of the product.

EXAMPLES

The following examples are presented to further illustrate and explain the present invention and should not be taken as limiting in any regard. All percents used are on a weight/weight basis.

The following tests were used throughout the examples:
Viscosity Measurement:

Two instrumental analyses, Micro Visco-Amylo-Graph Universal (MVAG-U) and Rapid Visco Analyser (RVA), were utilized to characterize the viscosity changes of annealed starches and compared to the native, unmodified starches.

Viscosity Profile Using Micro Visco-Amylo-Graph Universal (MVAG-U):

The viscosity profile of native and physically treated starches was measured by MVAG-U, model #803222 (11V, 50/60 Hz) supplied by Brabender GmbH & Co. KG in Duisburg, Germany. Viscograph Evaluation and Viscograph correlation software were utilized to analyze the viscosity data.

Preparation of pH-6.0 Buffer Solution:

7.74 grams of citric acid, monohydrate ($C_6H_8O_7*H_2O$, FW=210.14, J. T. Baker #0110 or equivalent) and 17.93 grams of sodium phosphate, dibasic, anhydrous ($Na_2HPO_4$, FW=141.96, J. T. Baker #3828 or equivalent) was dissolved in 974.33 grams of distilled or deionized water.

Set-Up and Sample Preparation:

| | |
|---|---|
| Starch Weight | 6.6 anhydrous grams |
| Total Charge Weight | 110.0 grams |
| Solids | 6.0% based on starch solids |
| Matrix | pH-6.0 buffer |
| Other material in charge | None |

Prepare and run the sample as follows:
1) Weigh the 6.6 anhydrous grams of starch to the measuring bowl within ±0.05 grams of the target weights.
2) Add pH-6.0 buffer solution to a total weight of 110.0±0.05 grams.
3) Load the following parameters with the temperature profiles for the heating and cooling.

| Speed 150 [1/min] | | Measurement range 110 [cmg] | |
|---|---|---|---|
| Segment | Slope (° C./min) | Ramp Time HH:MM:SS | Temperature (° C.) | Hold Time HH:MM:SS |
| 0 | | | 50 | |
| 1 | 8.0 | 00:05:38 | 95 | 00:15:00 |
| 2 | −3.0 | 00:22:20 | 28 | 00:20:00 |
| 3 | 0 | 00:00:00 | 28 | 00:00:00 |

4) Several evaluation points were taken to characterize the starch viscosity.

Initial gelatinization/pasting temperature: During the initial heating phase, the starch begins to swell which is recorded as a rise in viscosity. Temperature at which starch reaches viscosity of 30 MVU or higher from the baseline is recorded as gelatinization/pasting temperature.

a. Peak viscosity: Viscosity when a majority of starch granules have undergone gelatinization and considered to be cooked-out and fully swollen, intact granule.

b. End viscosity: Final end viscosity upon cooling as per the methodology used.

c. Measuring viscosity development rates (MVU/sec)

1. Viscosity development rate 1: Measured by dividing the time it takes to reach viscosity from 100 to 600 MVU.

Rate 1: $[600\ MVU - 100\ MVU]/[time_{600\ MVU} - time_{100\ MVU}]$

2. Viscosity development rate 2: Measured by dividing the time it takes to reach peak viscosity or viscosity reached at end of 95° C. hold from 100 MVU.

Rate 2: $[600\ MVU - 100\ MVU]/[time_{peak\ or\ 95°\ C.\ hold} - time_{100\ MVU}]$ Viscosity Breakdown: $100\% * [Viscosity_{peak} - Viscosity_{end95°\ hold}]/[Viscosity_{peak}]$ Viscosity Measurement Using Rapid Visco Amylograph Native and physically modified starches were tested under the following conditions: Sample preparation: 1 g of "as is" starch and 25 g of salt/sugar solution are weighed in an RVA cup.

RVA Set-up: Time/Temperature profile
RVA profile: Profile Description: Standard 1 (STD1)

| Time | Type | Value |
|---|---|---|
| 00:00:00 | T | 50 |
| 00:00:00 | S | 960 |
| 00:00:10 | S | 160 |
| 00:01:00 | T | 50 |
| 00:04:42 | T | 95 |
| 00:07:12 | T | 95 |
| 00:11:00 | T | 50 |

Profile End Time: 00:13:00
Profile Idle Temp: 50

TABLE 1

| Sugar- Salt solution composition: | |
|---|---|
| Ingredient | % in the solution |
| Salt | 1.3% |
| Sugar | 0.8% |
| Water | 97.9% |
| Total | 100% |

Thermal Analysis by Differential Scanning Calorimetry (DSC)

Calorimetric methods have also been used to study gelatinization behavior of starches. In this invention, Differential Scanning calorimetry (DSC) was used to measure thermal transition (i.e. gelatinization temperature and gelatinization enthalpy) of starches. The solution matrix and/or presence of sugar, salt, lipids, proteins, hydrocolloids etc. have been known to significantly influence the gelatinization behavior of starches. Therefore, the native and physically modified starches were tested in water as well as a model food formulation matrix (sugar-salt solution).

Perkin Elmer DSC 8500 with cooling accessory Intracooler 2P was used to measure the thermal properties of the above starches in 1) deionized water and 2) sugar-salt solution. The samples were scanned from 5-140° C. at 10° C./min heat rate. Gelatinization temperatures ($T_{onset}$, $T_{peak}$, $T_{end}$-° C.) and enthalpy values ($\Delta$H-Joules/gram) are reported.

1) DSC: Onset of Gelatinization in Deionized (DI) Water

DI Water: Approximately 10 mg of anhydrous starch was weighed into a stainless steel hermetic DSC pan and water was added to make the water to starch ratio of 3:1 (R=3).

2) DSC: Onset of Gelatinization in Model Food System

Approximately 10 mg of anhydrous starch was weighed into a stainless steel hermetic DSC pan and sugar salt solution was added to make the solution to starch ratio of 2.5:1.

TABLE 2

| Sugar- Salt solution composition: | |
|---|---|
| Ingredient | % in the solution |
| NaCl | 20.7% |
| Sugar (sucrose) | 12.7% |
| Water | 66.6% |
| Total | 100% |

As agreed by starch chemists, starch gelatinization is described as the "collapse (disruption) of molecular orders within the starch granule manifested in irreversible changes in properties such as granular swelling, native crystalline melting, loss of birefringence, and starch solubilization.

These physically modified starches show changes in visco-elastic properties, crystallinity (extent and type), gelatinization and retrogradation, swelling behavior, enzyme digestibility and other properties. These types of changes are more pronounced in amylose containing starches having type-B crystalline pattern (e.g. potato, yam etc.), whereas, type-A and waxy cereal starches show little changes in structural and functional characteristics. In this invention, was surprisingly found that sago starch having type A crystallinity pattern showed significant changes in the above mentioned functional properties without having a noticeable change in the X-ray pattern.

Example 1

Preparation of Physically Modified (Annealed) Starches

Annealed starches (sago, potato, tapioca, sweet potato, pea) were prepared by controlled heating at a specified pH of an aqueous suspension of an amylose-containing starch in intact granule form and an inorganic salt effective in raising the gelatinization temperature of starch. A range of starches from various botanical sources such as regular corn starch, regular potato starch, waxy potato starch, sweet potato starch, pea starch, tapioca starch, and sago starch were used.

Figure 1:
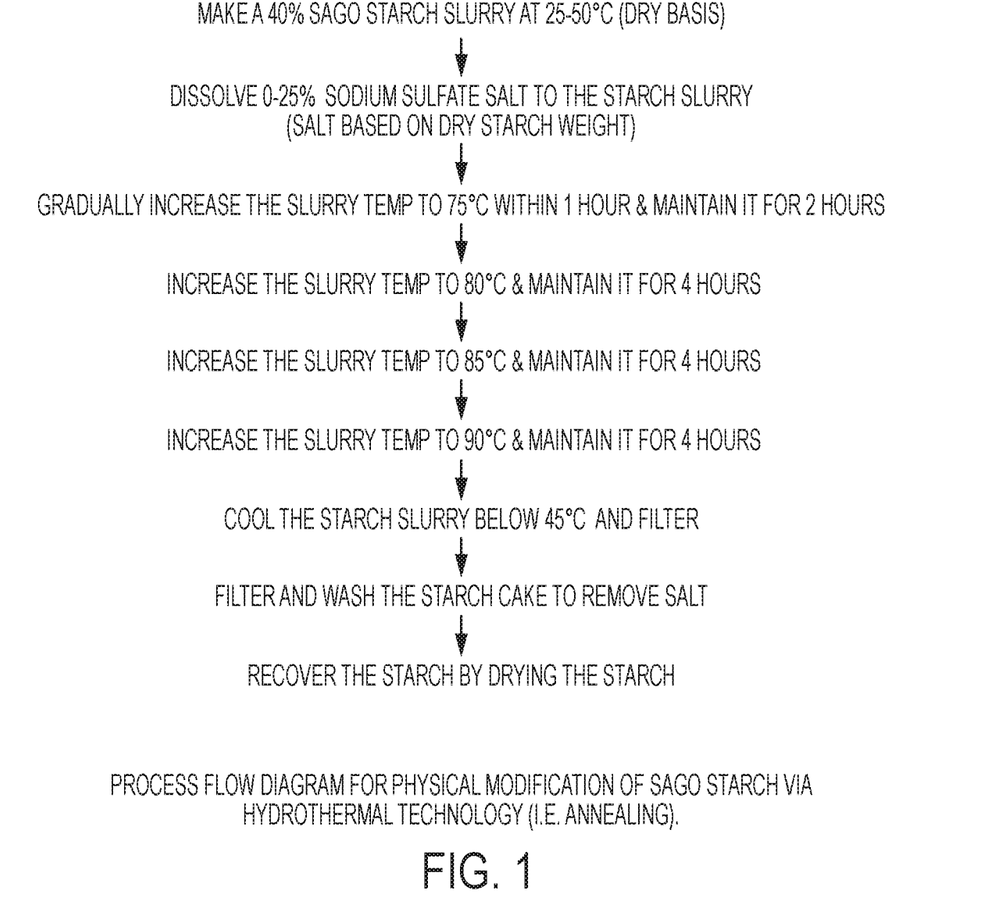
FIG. 1 depicts the process flow diagram of one body of the invention in which the starch is physically modified by annealing.
Figure 2:
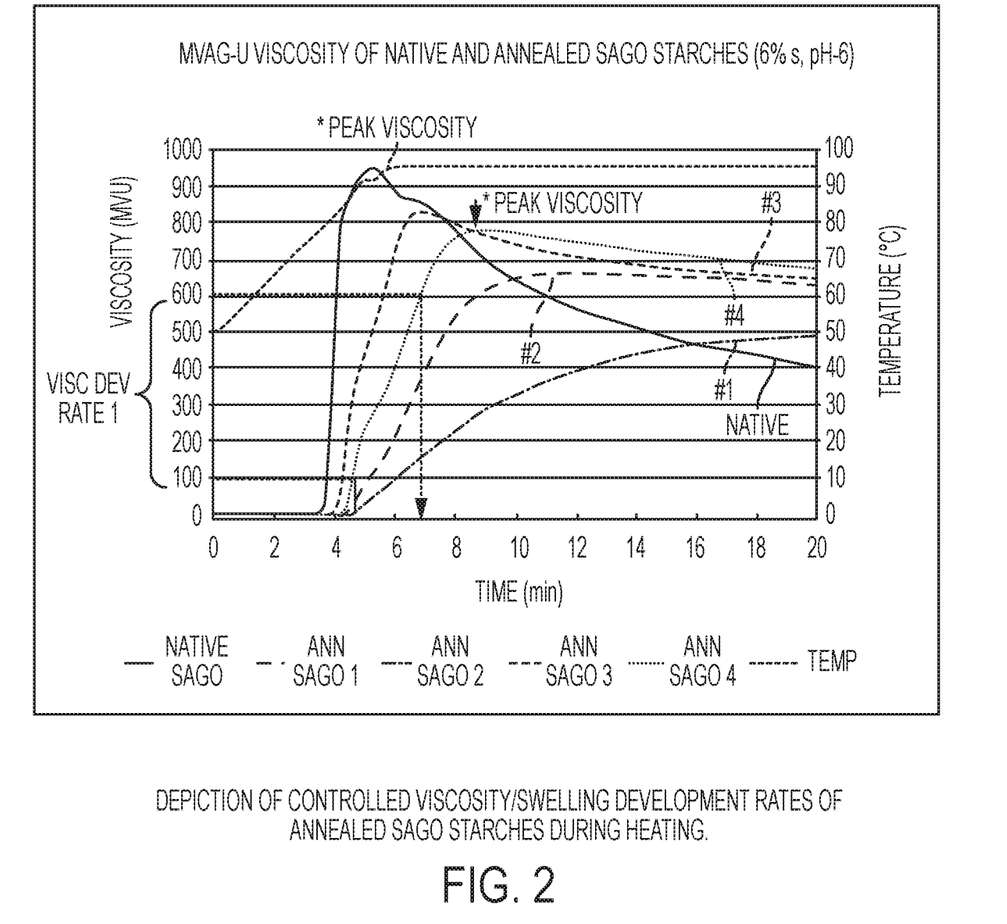
FIG. 2 depicts controlled viscosity/swelling development rates of annealed sago starches during heating.

The overall annealing process flow diagram specific for sago starch is depicted in FIG. 1. Similar annealing process flow is also used to anneal other starches described here, with adjustment of specific temperature and hold time described below in the description.

A. Annealed Sago Starch ANN1
1) Sago starch slurry was prepared by adding about 150 parts water per 100 parts by weight of starch at 25-50° C.
2) An inorganic salt, sodium sulfate was dissolved in the sago starch slurry. Twenty (20) to 25 parts of salt per 100 parts by weight of dry starch was added.
3) The starch-salt slurry was heated to a temperature of 75° C. within 1 hour (below the onset gelatinization temperature of the starch in that environment) and maintained for 2 hours. The slurry temperature was increased in a controlled manner to 80° C. and maintained for 4 hours. The slurry was then further increased in controlled manner to 85° C. and maintained for 4 hours.
4) Once the annealing treatment was complete, conventional recovery steps were used. The physically modified starch was recovered by filtering and washing out the salt. The starch slurry was cooled to 45° C. and filtered. The starch cake was washed twice with 150 parts water to remove any residual salt. The starch was recovered by air drying and finely ground using a mill to powder particle size similar to that of native sago.

B. Annealed Sago Starch ANN2 was prepared using the same method of Example 1A with the additional step of even further increasing the temperature to 90° C. in a controlled manner and holding for 4 hours after the hold at 85° C.

C. Annealed Sago Starch ANN3 was prepared using the same method as Example 1A with the exception that the hold at 80° C. was for three hours and the heating steps above 80° C. were deleted.

D. Annealed Sago Starch ANN4 was prepared using the same method as Example 1A with the exception that the heating steps above 80° C. were deleted and the starch was recovered by flash drying.

Brief Description of Sago Starches Used in the Examples:
1. Native Sago starch—Native unmodified sago starch
2. ANN Sago 1: [75° C. for 2 hrs→80° C. for 4 hrs→85° C. for 4 hrs], air-dried and milled.
3. ANN Sago 2: ANN sago [75° C. for 2 hrs→80° C. for 4 hrs→85° C. for 4 hrs→90° C. for 4 hrs], air-dried and milled.
4. ANN Sago 3: ANN sago [75° C. for 2 hrs→80° C. for 3 hrs→85° C. for 4 hrs], air-dried and milled.
5. ANN Sago 4: ANN sago [75° C. for 2 hrs→80° C. for 4 hrs], recovered by flash-drying.

Example 2

Comparative Starch Preparation

Native tapioca and potato starches were annealed for comparative purposes. The basic annealing process of Example 1 was used. A brief description of the comparative starches follows.
1. Native tapioca starch—Native unmodified tapioca starch
2. ANN tapioca 1: [75° C. for 2 hrs→80° C. for 4 hrs→85° C. for 4 hrs] air-dried and milled.
3. Native potato starch—Native unmodified potato starch
4. ANN potato 1: [65° C. for 2 hrs→75° C. for 4 hrs], air-dried and milled.

Example 3

Preparation of Physically Modified Starches Using Heat Moisture Treated (HMT) Process Using a spray-bottle, de-ionized water was sprayed on sago starch powder while mixing it in the Kitchen-Aid mixer. The final moisture content was adjusted from 15-35% at 5% moisture intervals. The moist starch powder was then sealed in glass jars and equilibrated overnight. The sealed moistened starch powder was heat-treated for 2-3 hours at 75-120° C. using the stock retort. After the heat-moisture treatment, the starch was air-dried and ground to fine powder.

Sample description for heat moisture treated (HMT) starches:
1. HMT sago 1—Moisture 20%, Temperature 100° C. for 3 hours
2. HMT sago 2—Moisture 30%, Temperature 100° C. for 3 hours
3. HMT sago 3—Moisture 20%, Temperature 115° C. for 3 hours Example 4

Delayed Viscosity Development and Controlled Swelling Behavior of Physically Modified Sago Starch Via Annealing The physically modified sago starches used in example 4 were made using annealing process as mentioned in example 1 and the description of the process is given.

Figure 3:
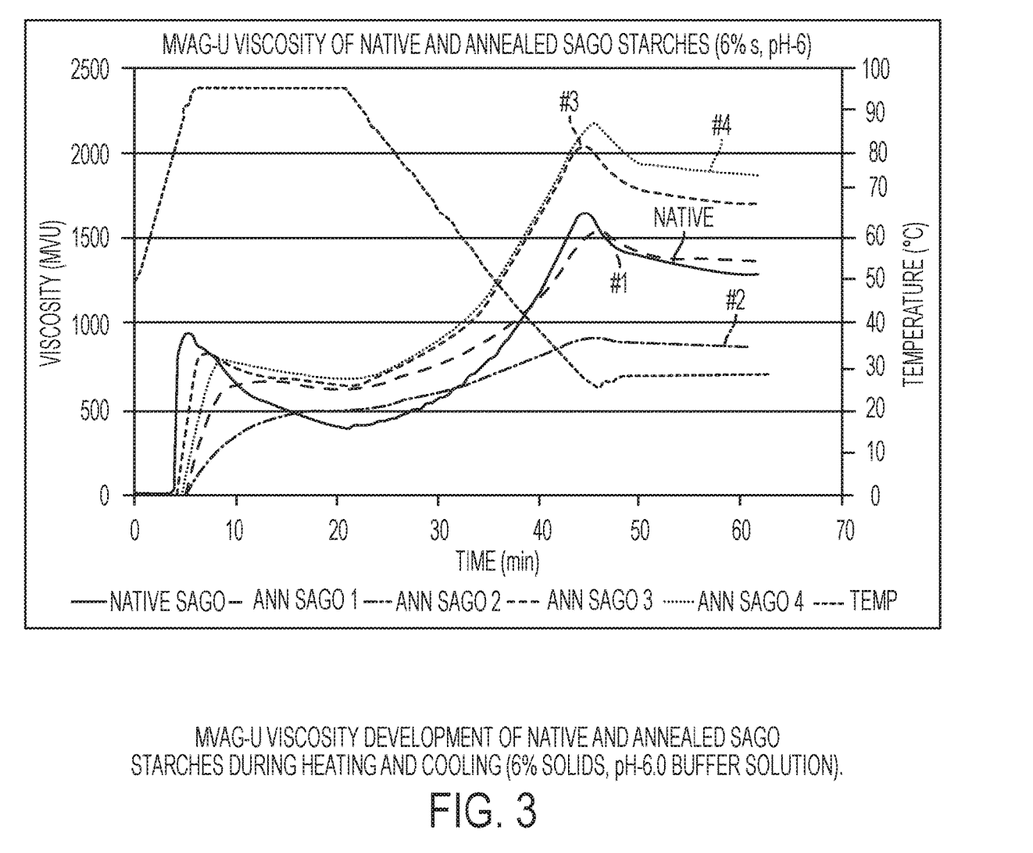
FIG. 3 depicts MVAG-U viscosity profile of native and annealed starches (6% solids—dry basis, pH-6.0 buffer solution).

FIG. 3 depicts MVAG-U viscosity profile of native and annealed starches (6% solids—dry basis, pH-6.0 buffer solution).

TABLE 3

Evaluation points for native and annealed sago using MVAG-U viscosity measurement.

| Sample | Onset of gelatinization [° C.] | Peak Viscosity [MVU] | Viscosity at 95° C. [MVU] | End Viscosity [MVU] |
|---|---|---|---|---|
| Native Sago | 78.3 | 951 | 904 | 1271 |
| ANN sago 1 | 86.2 | 660 | 190 | 1361 |
| ANN sago 2 | 89 | 495 | 74 | 862 |
| ANN sago 3 | 82.5 | 830 | 660 | 1673 |
| ANN sago 4 | 84.6 | 780 | 448 | 1863 |

As depicted in the FIG. 3 and Table 3 above, it is seen that the onset of pasting/gelatinization temperature of annealed sago starches increase significantly compared to the native unmodified starch. Additionally, depending on the extent of annealing process, the physically modified sago starch showed continual increase in viscosity up to 95° C. as well as during the hold at 95° C. showing very good process tolerance to heat and shear with minimal or no viscosity breakdown. This gradual and controlled viscosity development is indicative of delayed swelling behavior of the physically modified starch granules. The physically modified sago starches also showed significant textural improvements displaying smooth, non-cohesive texture desirable for food products. The retrograded starch paste after 24 hours showed differences in the gel strength behavior as well showing much softer gels for the annealed sago starches.

TABLE 4

Viscosity development rates for native and annealed sago starches using MVAG-U viscosity profiles (6% solids, pH-6.0 buffer).

| Sample | Visc Devel Rate 1 (600-100 MVU)/sec (MVU/second) | Visc Devel Rate 2 (peak visc-100 MVU)/sec (MVU/second) | Viscosity at 95 C. - Viscosity of @ 100 MVU (MVU) |
|---|---|---|---|
| Native Sago | 31.25 | 10.13 | 804 |
| ANN sago 1 | 2.34 | 1.53 | 90 |
| ANN sago 2 | 0.54 | 0.45 | — |
| ANN sago 3 | 8.33 | 4.59 | 560 |
| ANN sago 4 | 4.03 | 2.58 | 348 |

In order to evaluate the viscosity development rates and swelling behavior of the treated sago starches, several evaluation points were measured as depicted in Table 4. The native sago showed 30 MVU/sec viscosity development rate 1 to reach viscosity from 100 to 600 MVU, whereas, all of the physically modified starches showed a controlled rate of 0.54-8.33 MVU/second. Since many of the physically modified starches did not fully swell and cook-out as indicated by the viscosity profile and microscopy data (not shown here), a second extrapolation was done (linearity was assumed) to determine the viscosity development rate from the time it took to reach maximum swelling (i.e. peak viscosity) from 100 MVU viscosity. Again, it is clear, that the physically modified sago starches showed significantly lower viscosity development rate (0.45-4.49 MVU/sec) and controlled swelling behavior compared to the native starch (10.13 MVU/sec).

Figure 4:
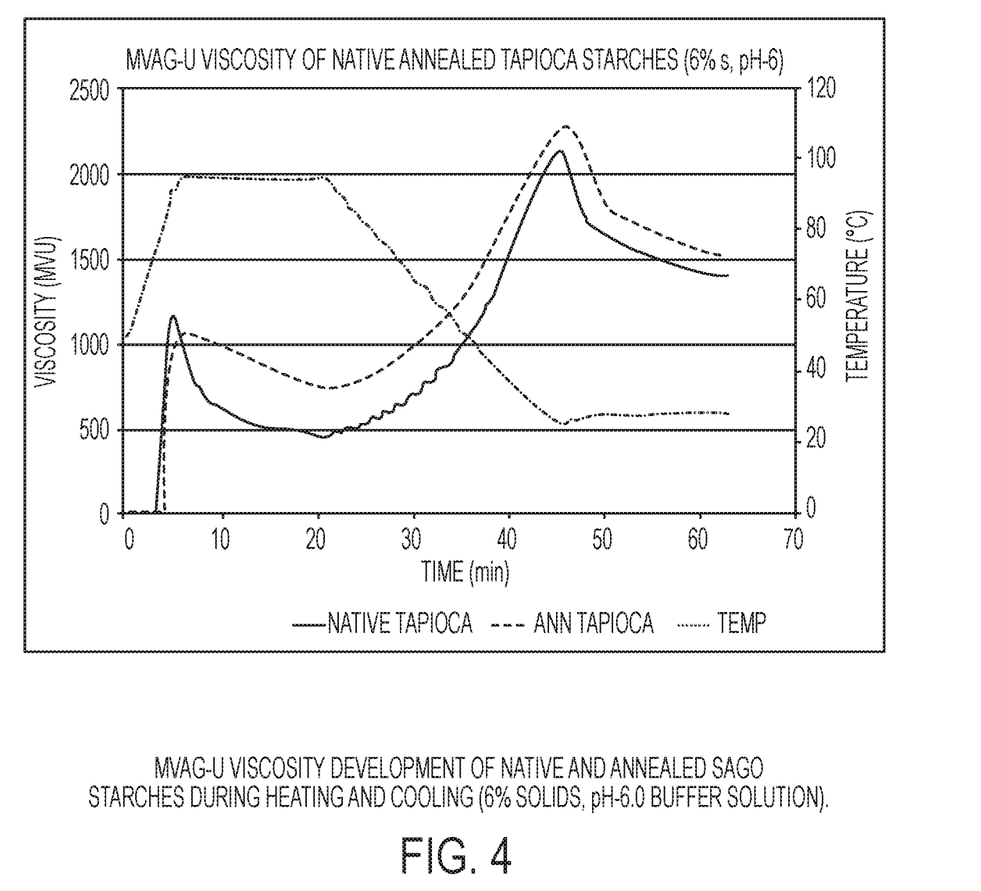
FIG. 4 depicts MVAG-U viscosity of native and annealed tapioca starch (6% solids, pH-6.0 buffer solution).

As shown in FIG. 4 (comparative), annealed tapioca starch showed delayed onset gelatinization/pasting temperature compared to the native base material, however, it did not show any delayed viscosity development or delayed swelling. The annealed tapioca starches rapidly cooked-out out to fully swollen state and did not exhibit the short and smooth, non-cohesive texture.

Example 5

Delayed Viscosity Development and Controlled Swelling Behavior of Physically Modified Sago Starch Via Annealing in Food Model System (Sugar-Salt Solution)

Figure 5:
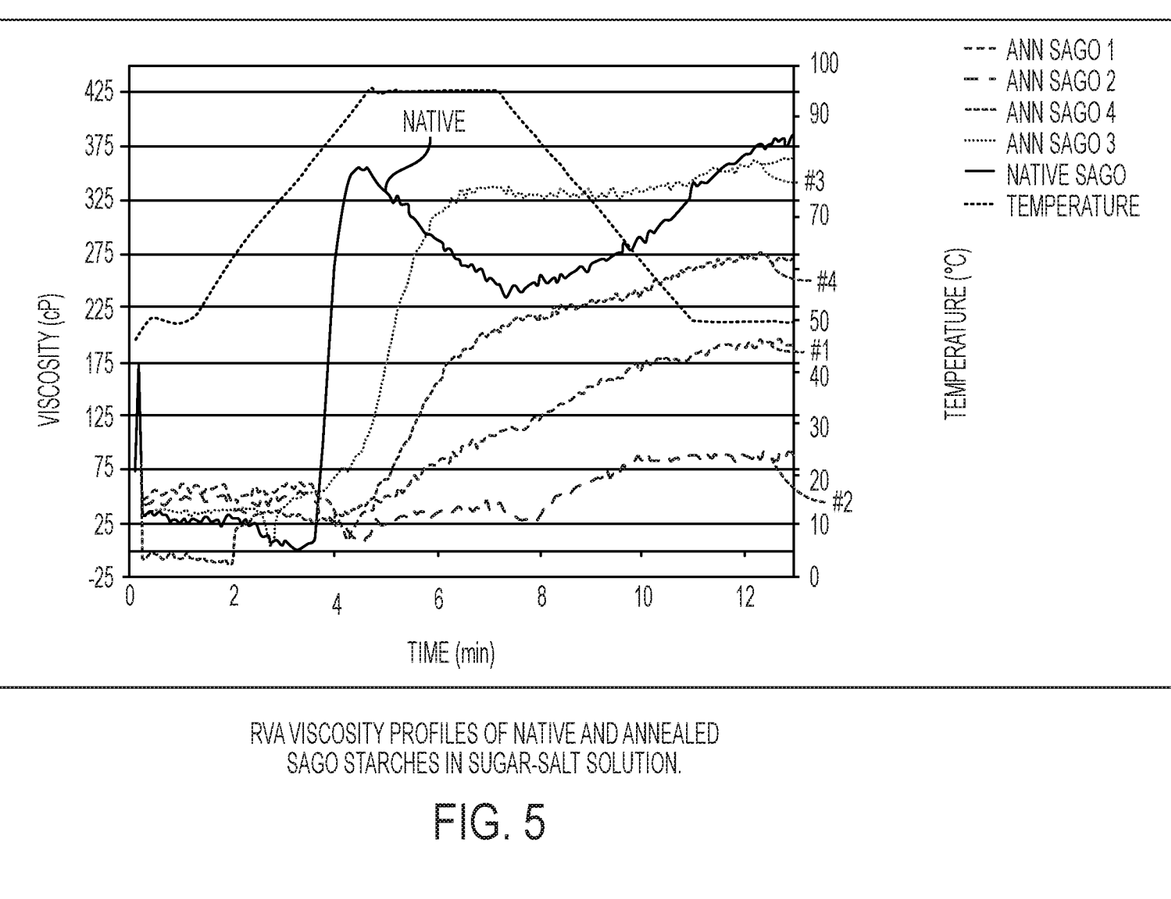
FIG. 5 depicts RVA viscosity profile of native and annealed sago starches in model food system (1% starch—"as is", sugar-salt solution).

The physically modified sago starches used in example 5 are made using an annealing process as mentioned in example 1 and the description of the process is given. Viscosity and swelling behavior of starches and its thickening performance was also measured using a food model system of sugar-salt solution. Depending on the extent of annealing, the physically modified sago starches can have a range of delayed viscosity development, delayed swelling and range of process tolerance depending on the application and processing parameters to make the food. As depicted in FIG. 5, the annealed sago starches showed delayed viscosity development (i.e. controlled and/or delayed swelling), and good thickening properties compared to native sago starch. Annealed sago starches showing significant delayed swelling (i.e. higher inhibition level) could be used in retorted food systems.

Example 6

Delayed Gelatinization of Physically Modified Sago Starch as Measured by DSC (in Sugar-Salt Solution)

The physically modified sago starches used in example 6 are made using annealing process as mentioned in example 1 and the description of the process is given.

TABLE 5

DSC thermal analysis of native and annealed sago starches in various solution matrix.

| Sample | $T_{onset}$ (° C.) | $T_{peak}$ (° C.) | $T_{end}$ (° C.) | delta H (J/g) |
|---|---|---|---|---|
| Matrix: Sugar-salt solution (R = 2.5) | | | | |
| Native Sago Starch | 74.3 | 82.4 | 92.8 | 18.1 |
| ANN sago 1 | 87.6 | 90.5 | 95.9 | 15.4 |
| ANN sago 2 | 90.7 | 93.6 | 98.1 | 11.2 |
| ANN sago 3 | 79.9 | 84.9 | 92.3 | 16.0 |
| ANN sago 4 | 81.0 | 85.6 | 92.5 | 16.6 |
| Matrix: De-ionized water (R = 3) | | | | |
| Native Sago Starch | 69.5 | 74.5 | 81.7 | 19.9 |
| ANN sago 1 | 76.8 | 79.5 | 84.6 | 20.3 |
| ANN sago 2 | 80.1 | 82.3 | 87.1 | 18.8 |
| ANN sago 4 | 75.0 | 78.5 | 84.2 | 19.2 |

Thermal properties in sugar-salt solution: The annealed sago starches showed a narrow gelatinization peak compared to the native starch and showed lower gelatinization enthalpy values in sugar-salt solution. The native starch showed $T_{onset}$ of 74.3° C. with a delta H value of 18.1 J/g. Depending on the annealing treatment conditions, the physically modified sago starches showed an increase of up to 15° C. having as high as $T_{onset}$ of 90.7° C. The enthalpy values of annealed sago starches also decreased (as much as by 6.9 J/g) while retaining intact granular structure. The physically modified sago starches displayed higher $T_{onset}$ and $T_{peak}$ temperatures while having an equivalent (data not shown) or reduced enthalpy values. The higher onset and peak gelatinization temperatures correlate well with the RVA data indicating higher resistance to swelling of the annealed sago starches. Similar thermal behavior is typically observed for the chemically cross-linked starches. The physical modification process can be controlled to obtain desired level of increase in onset gelatinization temperature to meet the process stability of the desired food application.

Thermal properties in DI water: As shown in Table 5, Increase in $T_{onset}$ (70-80.1° C.) and $T_{peak}$ (75-82.3° C.) gelatinization temperatures were observed for annealed sago starches in the DI water. The annealed starches showed significantly higher $T_{onset}$ and $T_{peak}$ temperatures while having similar or slightly reduced enthalpy values compared to the native starch.

Figure 6:
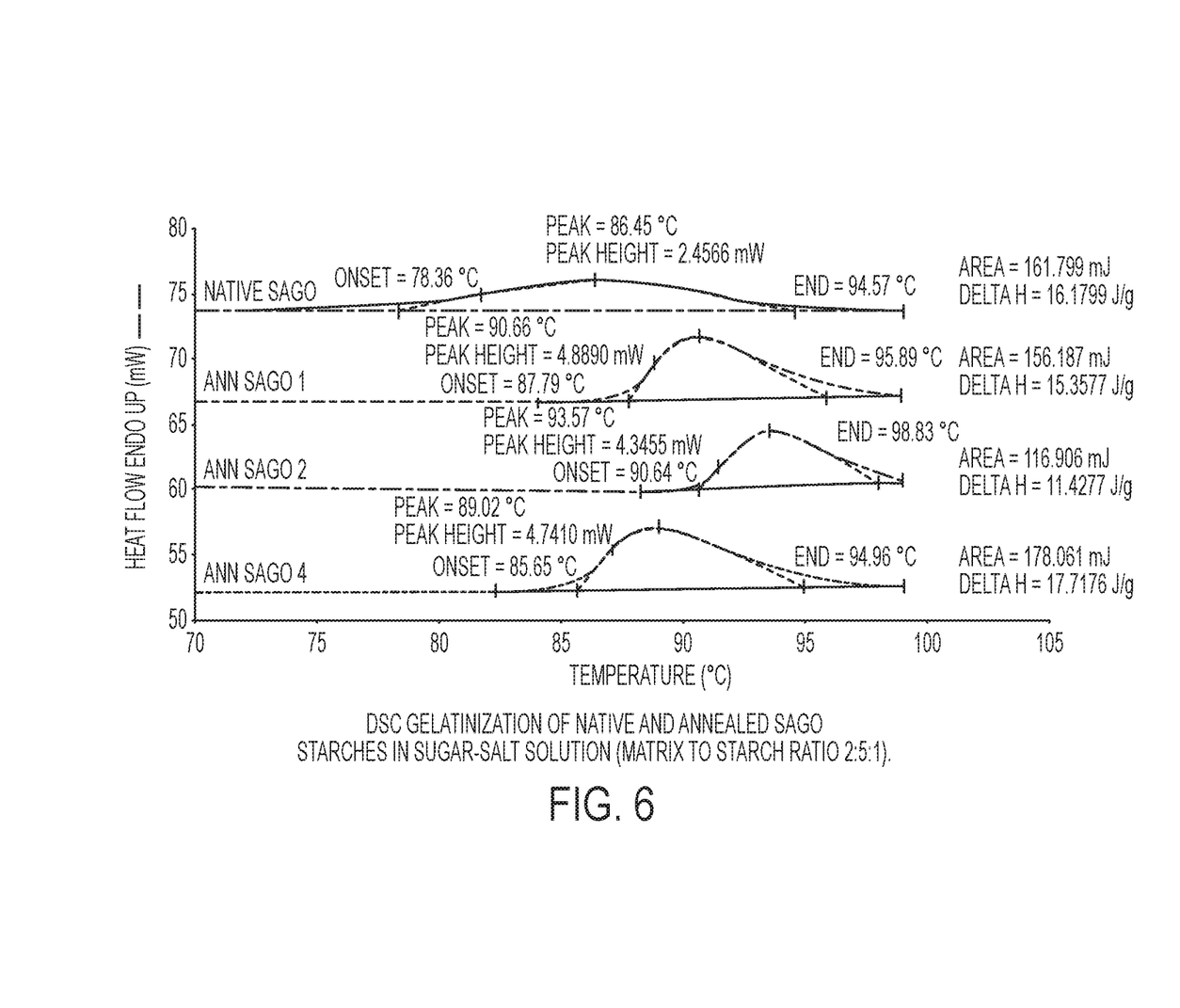
FIG. 6 depicts gelatinization profile of native and annealed sago starches in sugar salt solution.
Figure 7:
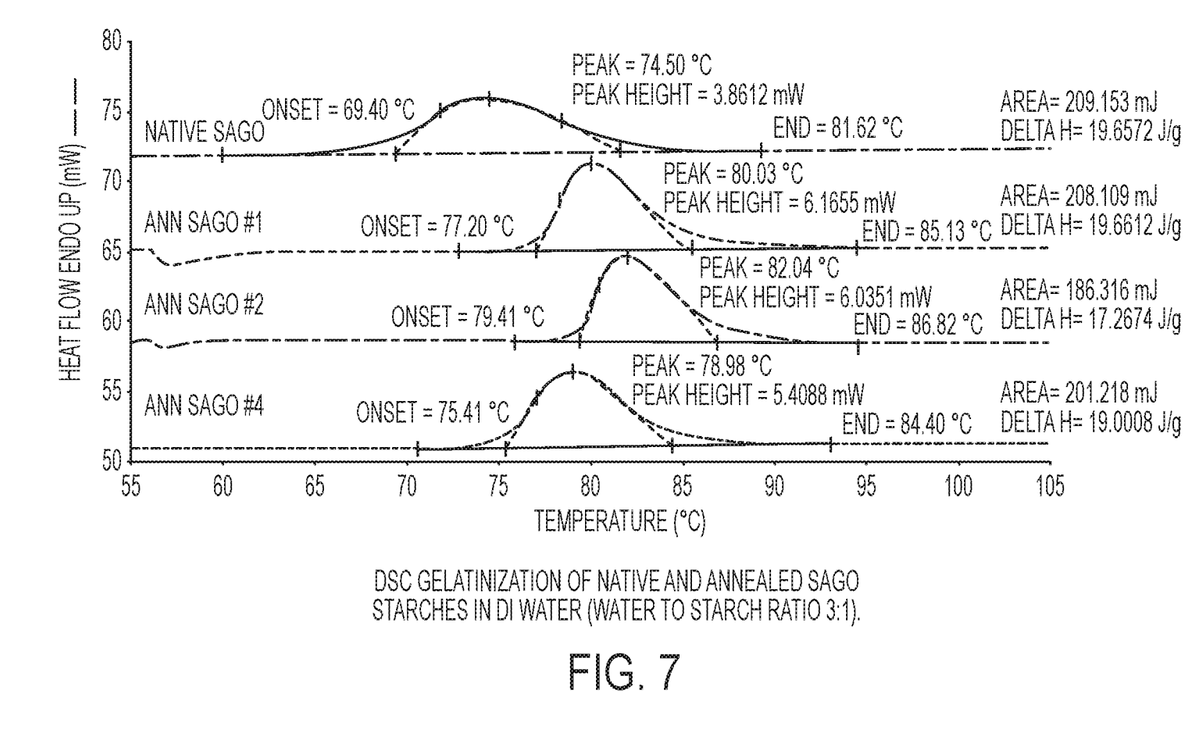
FIG. 7 depicts gelatinization profile of native and annealed sago starches in deionized (DI) water.

As seen in FIGS. 6 and 7, the differences in gelatinization temperature between native and various annealed sago starches can be attributed to molecular (re)organization as well as granular architecture in terms of crystalline to amorphous ratio. The broader gelatinization peak (Tend–Tpeak) of native starch suggests heterogeneity of crystallites within the starch granule, sometimes referred to as metastable crystals. The narrowness of the peaks of annealed sago starches can be attributed to the maturation of starch crystals to a more thermostable state which then melts at higher temperature. The delta H values have been shown to represent the number of double helices that unravel and melt during gelatinization. The lowering of delta H values in sugar-salt solution suggests that some of the double helices present in crystalline and amorphous regions of the granule may disrupt easily in that environment; it is known that type and amount of salt under specific conditions impact the energy required to melt the starch crystals. There is no destablization agent to influence the gelatinization behavior in DI water.

Example 7

Delayed Gelatinization of Heat Moisture Treated Sago Starches

The heat moisture treated sago starches were prepared according to example 3 and the description is given there.

TABLE 6

DSC thermal analysis of native and HMT sago starches in DI water.

| Sample | $T_{onset}$ (° C.) | $T_{peak}$ (° C.) | $T_{end}$ (° C.) | delta H (J/g) |
| --- | --- | --- | --- | --- |
| Native Sago | 69.5 | 74.5 | 81.7 | 19.9 |
| HMT sago 1 | 71.5 | 76.5 | 84.2 | 17.7 |
| HMT sago 2 | 74.8 | 81.4 | 88.7 | 13.0 |
| HMT sago 3 | 72.3 | 79.1 | 87.1 | 15.3 |

As displayed in Table 6, the heat moisture treated starches also showed significant increase in the $T_{onset}$ and $T_{peak}$ gelatinization temperatures similar to the annealed sago starches. The delta H values were lower for the HMT sago starches compared to the native starch. The HMT sago starches also showed controlled swelling/viscosity behavior and process tolerance under heat, shear and acidic environment. The HMT starches also exhibited short, smooth non-cohesive texture as well with good viscosifying power.

Example 8

X-Ray Crystallinity Measurement of Native and Physically Modified Sago Starch

Figure 8:
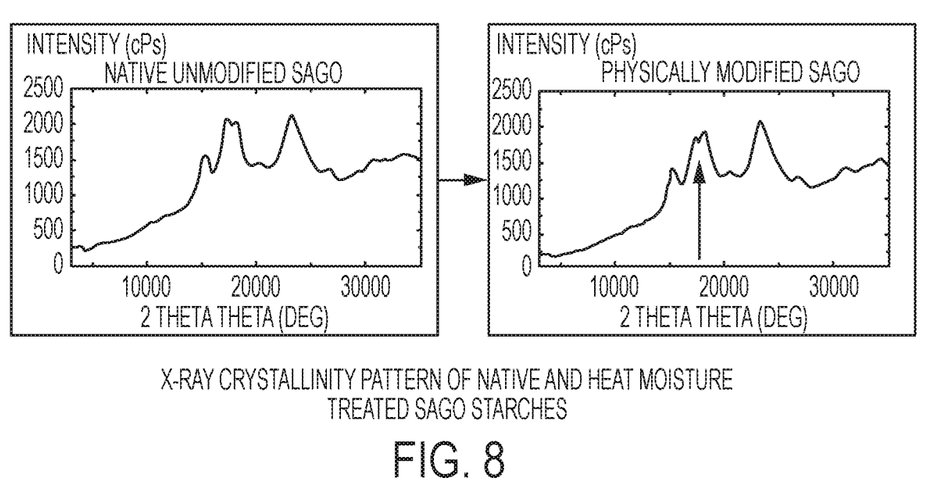
FIG. 8 depicts X-ray diffraction pattern of native and HMT sago starches.

The FIG. 8 shows x-ray diffraction pattern of native and physically modified HMT sago starches. The native sago starch displays an A type crystallinity. After heat-moisture treatment, the physically modified sago starch showed little change in the type of crystallinity with slight molecular reorganization around 16-18 theta. However, significant changes in the delayed gelatinization temperatures (DSC), delayed viscosity development (i.e. delayed/controlled swelling) with significantly improved textural attributes. Typically in other starch bases, crystalline type B starches show these attributes, but significant changes in molecular reorganization take place which converts crystalline type B→type A.

Example 9

Correlation of DSC Onset Gelatinization and Delayed Viscosity Development of Native and Physically Modified Sago Starch Table 7 depicts the correlation between DSC onset gelatinization temperature with RVA end viscosity and MVAG-U viscosity development rate 1. The physically modified starches of this invention demonstrate good process stability by having controlled swelling and viscosity development. Combination of factors such as onset gelatinization temperature, viscosity development rate and final end viscosity are critical for good functional performance. As seen in Table 7, annealed sago starch shows very good combination of high onset gelatinization (>75° C.), and end viscosity as well as significant reduction in swelling rate during heating. This combination of attributes allows the annealed sago starch to have desirable functional performance of controlled swelling and viscosity development. Although the annealed tapioca shows higher onset gelatinization temperature, the viscosity development rate during heating was rapid compared to native tapioca starch (FIG. 4). This type of rapid swelling behavior is not desirable where viscosity development needs to be controlled. The annealed potato starch showed higher $T_{onset}$, but significant reduction in end viscosity. The overall viscosity development rate was reduced. However, the maximum $T_{onset}$ for annealed potato starch is about 70° C. in sugar-salt solution, which significantly limits its application requiring higher process tolerance (heat, shear and pH ranges).

TABLE 7

Onset gelatinization (DSC) and RVA end viscosity data of native and annealed starches.

| Sample | DSC $T_{onset}$ [sugar-salt] (° C.) | RVA end viscosity [sugar-salt] (cP) | MVAG-U Visc Dev Rate 1 (600-100 MVU)/sec [DI water] (MVU/second) |
| --- | --- | --- | --- |
| Native Sago | 74.5 | 380 | 31.25 |
| ANN sago 1 | 87.8 | 200 | 2.34 |
| ANN sago 2 | 90.8 | 90 | 0.54 |
| ANN sago 3 | 80.0 | 360 | 8.33 |
| ANN sago 4 | 80.0 | 280 | 4.03 |
| Native Tapioca | 68 | 370 | 14.7 |
| ANN Tapioca | 82.6 | 390 | 25.0 |
| Native Potato | 56.6 | 580 | 33.3 |
| ANN Potato | 68.2 | 100 | 0.86 |

I claim:
1. A food product being a dry mix comprising:
   a physically modified sago starch in an amount from 5% to 80% (w/w) of the food product and a second edible ingredient;
   wherein the physically modified sago has
   i) substantially the same molecular weight as a native sago starch;
   ii) an onset of gelatinization temperature as measured by DSC in deionized water of at least 71° C.,
   iii) a controlled viscosity developed from 100-600 MVU of less than 15 MVU/second,
   iv) a peak viscosity of a least 400 MVU, and
   v) a viscosity break down of less than 40% from peak viscosity.
2. The food product of claim 1 being a dry mix wherein the physically modified sago starch has an onset of gelatinization temperature at least 2° C. higher than a native sago starch.
3. A method of making a food product being a dry mix comprising:
   mixing a physically modified sago starch in an amount from 5% to 80% (w/w) of the food product with a second edible ingredient wherein the physically modified sago starch has
- i) substantially the same molecular weight as a native sago starch;
- ii) an onset of gelatinization temperature as measured by DSC in dionized water of at least 71° C.,
- iii) a controlled viscosity developed from 100-600 MVU of less than 15 MVU/second,
- iv) a peak viscosity of a least 400 MVU, and v) a viscosity break down of less than 40% from peak viscosity.

4. The method of claim 3 further comprising forming a batter and baking the batter to make the food product.

5. The method of claim 3 wherein the method makes a food product selected from the group consisting of breads, cakes, brownies and muffins.

6. The method of claim 3 wherein the physically modified sago starch further has a gelatinization temperature at least 2° C. higher than a native sago starch.

* * * * *